US009116518B2

(12) United States Patent
Godel et al.

(10) Patent No.: US 9,116,518 B2
(45) Date of Patent: Aug. 25, 2015

(54) METHOD AND A DEVICE FOR DETECTING AN ELECTRICAL FAILURE AFFECTING AN ELECTRIC CONTROL SYSTEM OF A HYDRAULIC ACTUATOR OF VARIABLE GEOMETRIES OF AN AEROENGINE

(75) Inventors: Franck Godel, Chartrettes (FR); Nicolas Marie Pierre Gueit, Paris (FR); Julien Marcel Roger Maille, Saint Cheron (FR); Benoit Pontallier, Paris (FR)

(73) Assignee: SNECMA, Paris (FR)

( * ) Notice: Subject to any disclaimer, the term of this patent is extended or adjusted under 35 U.S.C. 154(b) by 1190 days.

(21) Appl. No.: 13/069,999

(22) Filed: Mar. 23, 2011

(65) Prior Publication Data

US 2011/0234236 A1 Sep. 29, 2011

(30) Foreign Application Priority Data

Mar. 24, 2010 (FR) ...................................... 10 52116

(51) Int. Cl.
*G01R 31/34* (2006.01)
*G05B 23/02* (2006.01)
*G05B 9/03* (2006.01)

(52) U.S. Cl.
CPC .............. *G05B 23/0235* (2013.01); *G05B 9/03* (2013.01)

(58) Field of Classification Search
CPC .. G05B 23/0235; G05B 9/03; G05B 23/0286; F02K 1/766
USPC ..................... 244/53 R; 324/103 R
See application file for complete search history.

(56) References Cited

U.S. PATENT DOCUMENTS

| 7,246,024 | B2 * | 7/2007 | Muramatsu et al. .......... 702/116 |
| 7,482,709 | B2 | 1/2009 | Berenger |
| 8,975,911 | B2 * | 3/2015 | Maalioune ............... 324/765.01 |
| 2005/0146302 | A1 * | 7/2005 | Kamio et al. ................. 318/647 |
| 2008/0084201 | A1 * | 4/2008 | Kojori ........................ 324/117 R |
| 2009/0320444 | A1 * | 12/2009 | Nouhaud ..................... 60/226.2 |
| 2010/0286959 | A1 * | 11/2010 | Novis et al. ................... 702/183 |
| 2011/0050277 | A1 * | 3/2011 | Maalioune ............... 324/765.01 |

FOREIGN PATENT DOCUMENTS

| EP | 1 852 347 A1 | 11/2007 |
| FR | 2 734 925 | 12/1996 |

OTHER PUBLICATIONS

French Preliminary Search Report issued Nov. 10, 2010, in French 1052116, filed Mar. 24, 2010 (with English Translation of Category of Cited Documents).

* cited by examiner

*Primary Examiner* — Benjamin M Baldridge
(74) *Attorney, Agent, or Firm* — Oblon, McClelland, Maier & Neustadt, L.L.P.

(57) ABSTRACT

After the control system has been started, which system has two control paths that are used as alternatives for delivering a control electric current to an electrohydraulic member for transforming said current into hydraulic power that is delivered to the actuator, and before powering a starter-generator of the engine, the detection method comprises implementing the following steps for each of the control paths in succession:
  delivering a predetermined test electric current over said path;
  evaluating a difference between the test electric current and a measurement of the electric current as transformed into hydraulic power by the electrohydraulic member; and
  if said difference is greater than a predefined threshold, detecting an electrical failure on said path.

7 Claims, 2 Drawing Sheets

METHOD AND A DEVICE FOR DETECTING AN ELECTRICAL FAILURE AFFECTING AN ELECTRIC CONTROL SYSTEM OF A HYDRAULIC ACTUATOR OF VARIABLE GEOMETRIES OF AN AEROENGINE

BACKGROUND OF THE INVENTION

The present invention relates to the general field of aeroengines.

More particularly, the invention relates to detecting electrical failure(s) affecting an electric control system of an actuator of variable geometries of an aeroengine. Such electrical failures may be due in particular to a loss of power to the control system, to a harness (conductor line) becoming disconnected, to a faulty sensor, etc.

The term "variable geometries" is used herein to mean the dimensions, shapes, and/or positions of members of the engine and/or the positions or speeds of members of pieces of equipment other than the rotary members of the engine, and suitable for being modified as a function of detected events or as a function of engine speeds.

Thus, the invention applies particularly, but in non-limiting manner, to detecting electrical failures that might affect an electric control system for a hydraulic actuator, e.g. such as an actuator for a thrust reversal, an actuator for opening and/or closing compressor bleed valves, an actuator for pivoting compressor stators, etc.

The electric control system of such an actuator generally comprises an electrohydraulic member (e.g. a servo-valve or a solenoid) suitable for receiving an electric current from controlling electronics over a so-called "active" control path and transforming it into hydraulic power that is delivered to the actuator.

In order to avoid a breakdown of the control system, the system is generally provided with a second control path that is said to be "passive". The second path is not used, and does not become active, unless the active first control path is considered as being too degraded to ensure proper operation of the control system.

Consequently, electrical failures may exist that affect the passive path, e.g. due to rupture or disconnection of a harness of said passive path, that are never detected so long as that path does not become active. It will readily be understood that detecting such failure only at that moment is much too late to guarantee proper operation of the engine.

There therefore exists a need for a method and a device for detecting electrical failures affecting a control system for an actuator of variable geometries of an aeroengine that does not present that drawback.

OBJECT AND SUMMARY OF THE INVENTION

The present invention satisfies this need by proposing a detection method of detecting at least one electrical failure affecting an electrical control system of a hydraulic actuator for actuating variable geometries of an aeroengine, the control system being provided with two control paths capable of being used in alternative manner for delivering a control electric current to an electrohydraulic member for transforming said electric current into hydraulic power that is delivered to the actuator. In accordance with the invention, the detection method comprises, after the control system has been started and before a starter-generator of the engine is powered, implementing the following steps for each of the control paths in succession:

delivering a predetermined test electric current over said control path;

evaluating a difference between the test electric current and a measurement of the electric current as transformed into hydraulic power by the electrohydraulic member; and if said difference is greater than a predefined threshold, detecting an electrical failure on that path.

Correspondingly, the invention also provides a detector device for detecting at least one electrical failure affecting an electric control system of a hydraulic actuator for actuating variable geometries of an aeroengine, the control system being provided with two control paths capable of being used in alternative manner for delivering a control electric current to an electrohydraulic member for transforming said electric current into hydraulic power that is delivered to the actuator. In accordance with the invention, the detector device comprises means that are activated after the control system has been started and before a starter-generator of the engine is powered, and suitable, for each control path in succession, for performing the following steps in succession:

delivering a predetermined electric test current over said control path;

evaluating a difference between the electric test current and a measurement of the electric current as transformed into hydraulic power by the electrohydraulic member; and if said difference is greater than a predefined threshold, detecting an electrical failure on said path.

In other words, the invention proposes implementing prior verification (or "self-testing") of the electric control system of the hydraulic actuator as soon as the control system is powered, and before the starter-generator of the engine is powered, i.e. before the fuel pump of the engine is capable of delivering hydraulic power to the actuator.

As a result, both control paths of the control system are tested without waiting for them to be used in the servo-control of the actuator.

The test control current used in the invention is not intended to control the actuator, but only to test it. It is advantageously selected in such a manner as to be capable of identifying the presence of electrical failures in the actuator control system while not impeding normal operation of the engine.

Thus, the self-test operation performed by the invention is transparent and does not affect the other regulation functions implemented in the engine.

In addition, both of the control paths of the control system are tested separately, one after the other. Thus, as soon as a failure is detected on one and/or the other of the control paths, it is possible to plan a maintenance operation on the actuator and its control system, and to do this long before the control system ceases to be operational.

It should be observed that the invention applies advantageously to actuators of any type, regardless of whether they are controlled using an open or a closed loop, and regardless of whether or not they are servo-controlled when the engine starts. The invention thus makes it possible to detect a "dormant" electrical failure in the control system, i.e. a failure that will appear only when the actuator is in operation or when the path is active while the engine is in operation.

The invention thus makes it possible to avoid an outright failure of the engine and to guarantee that it operates in sound and reliable manner.

Preferably, the predetermined test current is dimensioned to position the actuator in a rest position.

The term "rest position" is used herein to mean a position in which the actuator does not control (or does not actuate) the variable geometries. The variable geometries are thus to be found in a so-called "fall-back" configuration (a configuration that is defined by default).

Thus, the invention serves to detect electrical failures without moving or actuating the variable geometries.

In addition, when residual fluid pressure remains in the hydraulic actuator in spite of the engine being stopped, the test current advantageously enables the actuator to be put back into its rest position.

In a particular implementation, the electrical failure is detected when the difference between the test electric current and the measurement of the electric current transformed into hydraulic power by the electrohydraulic member is greater than the predefined threshold during a predetermined period.

In the corresponding embodiment, the detector means of the device of the invention are suitable for detecting an electrical failure when the difference between the test electric current and the measurement of the electric current transformed into hydraulic power by the electrohydraulic member is greater than the predefined threshold during a predetermined period.

As a result, it is possible to limit false alarms. Detection is thus more reliable and more robust.

In another aspect, the invention also provides an aeroengine including a detector device of the invention.

BRIEF DESCRIPTION OF THE DRAWINGS

Other characteristics and advantages of the present invention appear from the following description made with reference to the accompanying drawings showing an embodiment having no limiting character. In the figures.

DETAILED DESCRIPTION OF AN EMBODIMENT

Figure 1:
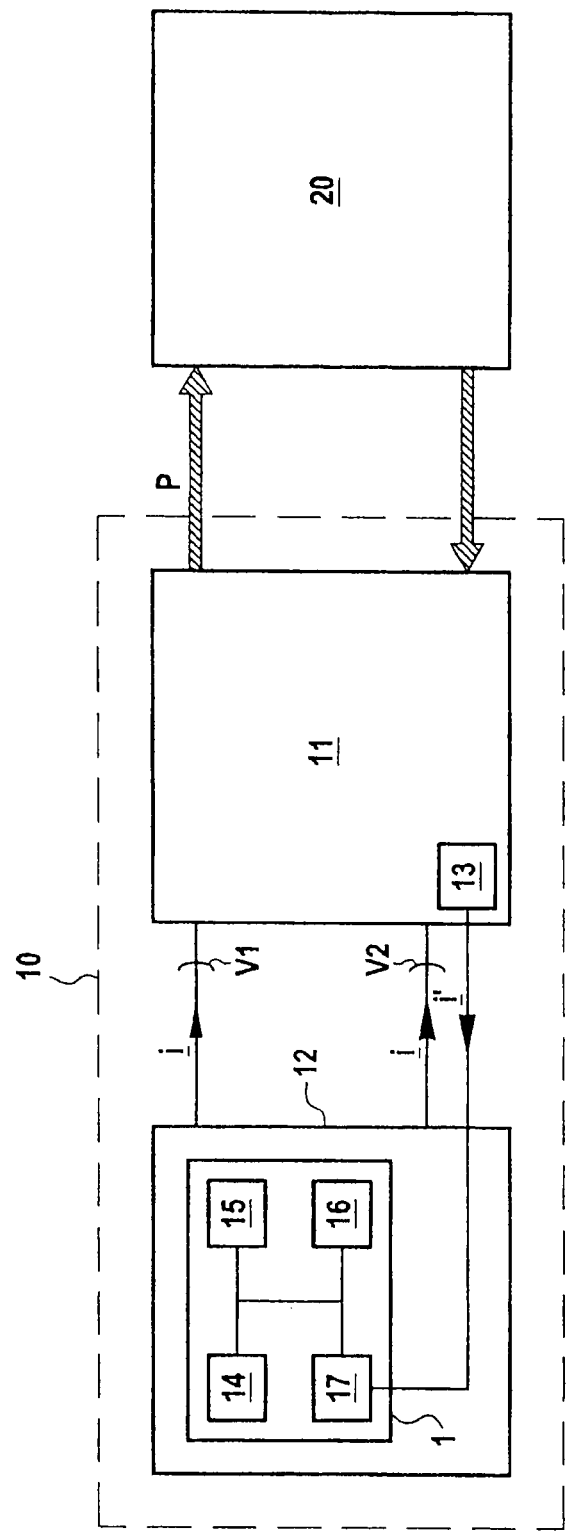
FIG. 1 shows a detector device in accordance with the invention in its environment, in a particular embodiment.

FIG. 1 shows a particular embodiment of a device 1 of the invention for detecting electrical failure(s), the device being shown in its environment.

In the example described herein, the purpose is to detect electric failure(s) affecting an electrical control system 10 of a hydraulic actuator 20 of a thrust reverser fitted to a turbojet (not shown).

Nevertheless, the invention also applies to other types of aeroengine, to other variable geometries, and to other types of actuator. For example, the invention may equally well be applied to fuel metering actuators or to actuators for adjusting nozzle vanes of variable pitch.

In known manner, the control system 10 comprises an electrohydraulic member 11 suitable for receiving control electric current $i$ from an electronic control unit (ECU) 12 and transforming it into hydraulic power P delivered to the actuator 20. The electrohydraulic member 11 in this example is a servo-valve.

The control electric current $i$ may be conveyed to the electrohydraulic member 11 via two control paths V1 and V2.

These two control paths are designed to be used as alternatives: only the path that is active at any given instant is suitable for conveying control current to the electrohydraulic member 11 at that instant. It is assumed here that the path V1 is active by default.

In the example described, each control path is associated with an indicator indicating the state of the path, also referred to as a "health word". The indicator is made up of a plurality of bits, each bit reflecting the presence or absence of a specific predefined fault or failure (e.g. an electrical failure).

The path that has the greater health word is the path that is the most degraded. The control system 10 switches to the passive path as soon as the active path has a health word that is greater than the health word of the passive path. The passive path then becomes the active path.

The control system 10 is also provided with a measurement device 13 adapted to measure the electric current $i'$ that genuinely passes through the electrohydraulic member 11 after a control current $i$ has been delivered by the ECU 12. In other words, the electric current $i'$ represents the electric current that was genuinely transformed into hydraulic power by the electrohydraulic member 11. The electric current $i'$ is referred to herein as the "return current" or the "feed-back current".

Such a measurement device is itself known and is not described in greater detail herein.

It should be observed that in the example described herein, the measurement device 13 is incorporated in the electrohydraulic member 11 and the detector device 1 is incorporated in the ECU 12. Nevertheless, this assumption is not limiting, it being possible for the detector device 1, the measurement device 13, and the ECU 12 to be incorporated in distinct devices of the control system that are in communication via data buses known to the person skilled in the art.

In this example the detector device 1 has the hardware architecture of a computer. It comprises in particular a processor 14, a random access memory (RAM) 15, a read-only memory (ROM) 16, and communications means 17.

The communications means 17 enable the detector device 1 firstly to communicate with the measurement device 13 and secondly to communicate with other pieces of equipment of the turbojet.

Figure 2:
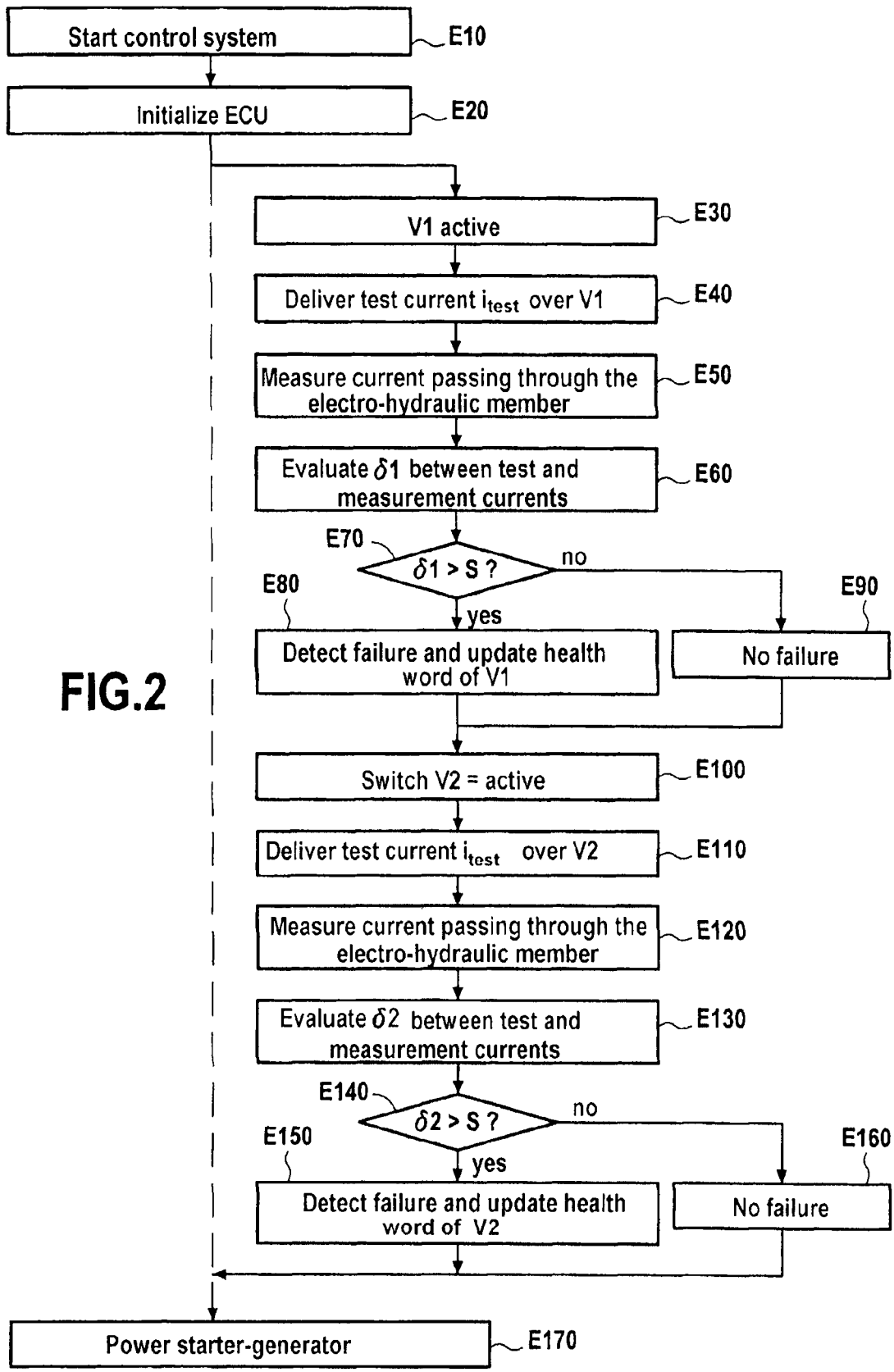
FIG. 2 is a flow chart slowing the main steps of a detection method in accordance with the invention when implemented in a particular embodiment by the detector device shown in FIG. 1.

The ROM 16 constitutes a storage medium readable by the processor 14 of the control device, and having stored therein a computer program including instructions for executing steps of a detection method in accordance with the invention, as shown in FIG. 2, described below.

As mentioned above, the detection method of the invention is remarkable in that it is implemented during a specific period that follows powering (or starting) the control system 10, and during which the turbojet fuel pump delivers no hydraulic power to the actuators.

In known manner, during actuation of the starting command of the control system 10, the ECU 12 enters into an initialization stage, during which it obtains in particular a certain number of measurements that are useful for controlling pieces of equipment of the turbojet. During this initialization stage, the ECU is powered by the electricity network of the aircraft, the starter-generator of the turbojet not yet being powered.

At the end of this initialization, the ECU sends an order to the controller of the starter-generator of the turbojet, instructing it to modify its exciter winding so as to switch to starter mode. The starter-generator is then powered in the meaning of the invention.

Thereafter, the ECU controls various accessories of the turbojet (switching on the fuel injectors, injecting fuel, etc.), until the turbojet actually starts. The electrical power supply to the ECU 12, and more generally to the control system 10, is subsequently provided by the turbojet.

Thus, the steps of the detection method of the invention are preferably implemented after the ECU has been initialized, and in any event before the starter-generator of the turbojet is powered, so as to avoid the turbojet driving the fuel pump via the accessory gearbox.

With reference to FIG. 2, there follows a description of the main steps of the method of the invention in a particular implementation of the invention.

After the control system has started (step E10), and after the ECU has been initialized (step E20), the path V1, here the default active path, is tested (step E30).

For this purpose, a control electric current $i_{test}$, referred to as the test electric current, is delivered by the ECU 12 to the path V1 (step E40).

Preferably, the test electric current $i_{test}$ is dimensioned so as to satisfy the following conditions:

1) in response to the test current, the actuator 20 should be positioned in its rest position (also referred to as its fall-back position); and 2) the test current must be greater than a predetermined threshold S, described below.

In this way, it is ensured that the test current does not move the thrust reverser and has no impact on the operation of the turbojet nor on its regulation.

The minimum current enabling the actuator to be positioned in its rest position is a known quantity, either provided by the manufacturer of the actuator, or in a variant that the person skilled in the art can determine using appropriate calibration tests. By way of example, the minimum current required for an actuator provided with a servo-valve having a solenoid is 0 amps (A).

It should be observed that the initial position of the actuator, prior to delivering the test current, may already be the rest position, in which case the test current maintains the actuator in the rest position. In contrast, if the actuator is in an initial position that is distinct from the rest position (as a result in particular of residual hydraulic pressure in the actuator), then the test current sends the actuator to its rest position and keeps it in that position.

Thus, it can readily be understood that the test current $i_{test}$ delivered by the ECU is not intended for actuating the thrust reverser, or more generally the variable geometry, by servo-controlling the actuator, but rather for testing the actuator control system.

After delivering the current $i_{test}$ over the path V1, the current flowing through the electrohydraulic member 11 is measured, i.e. the current that is transformed into hydraulic power by the electrohydraulic member 11 is determined using the measurement device 13 (step E50).

The measurement taken at the end of an engagement timeout greater than or equal to the time required for the current through the electrohydraulic member 11 to rise is written $m_{test}$.

The processor 14 of the detector device 1 then evaluates a difference $\delta 1$ that exists between the measurement $m_{test}$ as taken in this way and the test current $i_{test}$ (step E60):

$$\delta 1 = |m_{test} - i_{test}|$$

This difference $\delta 1$ is then compared with the predetermined threshold S (step 70).

The threshold S is preferably selected in such a manner as to take account of the accuracy of the measurement device 13 and of the ECU 12. This serves to limit false detections of failures in the control system. Thus, a failure is not attributed to one of the control paths under circumstances in which the only difficulty lies in the accuracy with which the measurements or the generated current is/are determined.

By way of example, if the accuracy of the measurement device 13 is plus or minus 12 milliamps (mA) and the accuracy of the ECU 12 is plus or minus 6 mA, then the threshold S should be selected to be greater than 18 mA (e.g. 20 mA).

In the example described herein, the steps E40 of sending a test current, E50 of measuring the current flowing through the electrohydraulic member 11, E60 of evaluating the difference $\delta 1$, and E70 of comparing it with the threshold S are repeated through a time period of predetermined duration T.

If throughout this period the difference $\delta 1$ is greater than the threshold S, then an electrical failure is detected on the path V1 (step E80).

The health word for the control path V1 is then updated to represent this electrical failure, and as a result it becomes greater than the health word of the control path V2. It is assumed here that both health words were initialized to a value representative of no failure on either of the two paths when the control system was started.

After this updating, the ECU 12 ceases to send the test current. The control device 10 switches automatically to the passive path V2, since the health word of the path V1 is greater than the health word of the path V2.

In contrast, if during the entire period T the difference $\delta 1$ is less than the threshold S, or oscillates on either side of the threshold S, it is assumed that the path V1 is not suffering from any electrical failure (step E90).

The health word of the path V1 remains unchanged. The ECU 12 ceases to deliver the test current, and the control device 10 is caused to switch to the passive path V2.

The path V2 that has not become active can then be tested in turn (step E100).

The steps:

E110 of sending test current over the path V2;

E120 of measuring the current that flows through the electrohydraulic member 11;

E130 of evaluating a difference 82 that exists between the measurement and the test current;

E140 of comparing the difference 82 with the threshold S; and

E150 and E160 of detecting or not detecting an electrical failure of the path V2 are similar to the above-described steps E40 to E90 respectively.

Thus, at the end of steps E150 and E160, both control paths of the control system 10 have been tested.

When the engine is powered (step E170), the control system 10 is thus in a configuration in which the path having the smaller health word is the active path.

In the example described herein, consideration is given to a control system and to an ECU controlling a single actuator. Nevertheless, this assumption is not limiting, and a control system and an ECU adapted to control a plurality of actuators could equally well be envisaged. The person skilled in the art will then have no difficulty in dimensioning the test current that is required in order to take account of the constraints of the various actuators (rest positions, initial positions, etc.).

What is claimed is:

1. A detection method for detecting at least one electrical failure affecting an electrical control system of a hydraulic actuator for actuating variable geometries of an aeroengine, the control system comprising two control paths capable of being used in an alternative manner for delivering a control electric current to an electrohydraulic member for transforming said electric current into hydraulic power that is delivered to the actuator, the detection method comprising:

after the control system has been started and before a starter-generator of the engine is powered, performing the following steps for each of the control paths in succession:

delivering a predetermined test electric current over said control path;

evaluating a difference between the test electric current and a measurement of the electric current transformed into hydraulic power by the electrohydraulic member; and if said difference is greater than a predefined threshold, detecting an electrical failure on that path.

2. A detection method according to claim 1, wherein the magnitude of the predetermined test current is sufficient to position the actuator in a rest position.

3. A detection method according to claim 1, wherein the electrical failure is detected when the difference between the test electric current and the measurement of the electric current transformed into hydraulic power by the electrohydraulic member is greater than the predefined threshold during a predetermined period.

4. A detector device for detecting at least one electrical failure affecting an electric control system of a hydraulic actuator for actuating variable geometries of an aeroengine, the control system comprising two control paths capable of being used in an alternative manner for delivering a control electric current to an electrohydraulic member for transforming said electric current into hydraulic power that is delivered to the actuator, the detector device comprising:

means that are activated after the control system has been started and before a starter-generator of the engine is powered, and which, for each control path in succession, perform the following steps in succession:

delivering a predetermined electric test current over said control path;

evaluating a difference between the electric test current and a measurement of the electric current transformed into hydraulic power by the electrohydraulic member; and if said difference is greater than a predefined threshold, detecting an electrical failure on said path.

5. A detector device according to claim 4, wherein the magnitude of the predetermined test current is sufficient to position the actuator in a rest position.

6. A detector device according to claim 4, wherein the detector means detect an electrical failure when the difference between the test electric current and the measurement of the electric current transformed into hydraulic power by the electrohydraulic member is greater than the predefined threshold during a predetermined period.

7. An aeroengine including a detector device according to claim 4.

* * * * *